(12) United States Patent
Stipe et al.

(10) Patent No.: US 9,747,935 B1
(45) Date of Patent: Aug. 29, 2017

(54) HEAT ASSISTED MAGNETIC RECORDING WRITER HAVING POLE COUPLED WITH THE NFT

(71) Applicant: Western Digital (Fremont), LLC, Fremont, CA (US)

(72) Inventors: Barry Stipe, San Jose, CA (US); Yi Wang, Mountain View, CA (US); Zhigang Bai, Fremont, CA (US); Stanley Burgos, Campbell, CA (US)

(73) Assignee: WESTERN DIGITAL (FREMONT), LLC, Fremont, CA (US)

( * ) Notice: Subject to any disclaimer, the term of this patent is extended or adjusted under 35 U.S.C. 154(b) by 0 days.

(21) Appl. No.: 15/199,034

(22) Filed: Jun. 30, 2016

(51) Int. Cl.
*G11B 5/02* (2006.01)
*G11B 11/00* (2006.01)
*G11B 5/48* (2006.01)
*G11B 5/60* (2006.01)
*G11B 5/00* (2006.01)

(52) U.S. Cl.
CPC .......... *G11B 5/4866* (2013.01); *G11B 5/6088* (2013.01); *G11B 2005/0021* (2013.01)

(58) Field of Classification Search
CPC ... G11B 5/4866; G11B 5/00826; G11B 13/08; G11B 2005/0021; G11B 2005/0029; G11B 5/6076; G11B 5/6052; G11B 5/3945; G11B 11/10532; G11B 11/10554; G11B 4/314
USPC ....... 360/59, 75, 66, 67, 234, 234.3, 125.31; 369/13.33, 13.13, 112.27
See application file for complete search history.

(56) References Cited

U.S. PATENT DOCUMENTS

| 7,529,158 | B2 | 5/2009 | Matsumoto et al. |
| 8,320,220 | B1 * | 11/2012 | Yuan ..................... G11B 5/314 369/112.27 |
| 8,705,327 | B2 | 4/2014 | Matsumoto |
| 2016/0329068 | A1 | 11/2016 | Matsumoto et al. |
| 2016/0351208 | A1 | 12/2016 | Matsumoto et al. |

* cited by examiner

*Primary Examiner* — Nabil Hindi
(74) *Attorney, Agent, or Firm* — Foley & Lardner LLP

(57) ABSTRACT

A heat assisted magnetic recording (HAMR) write apparatus has a media-facing surface (MFS) and is coupled with a laser that provides energy. The HAMR write apparatus includes a waveguide, a near-field transducer (NFT), a pole and coil(s) for energizing the pole. The waveguide is optically coupled with the laser and directs a first portion of the energy toward the MFS. The NFT is optically coupled with the waveguide. The pole writes to a region of the media and includes a pole tip. A first portion of the pole tip is at the MFS and is separated from the NFT in a down track direction. A second portion of the pole tip is recessed from the MFS and between the first portion and the NFT.

19 Claims, 3 Drawing Sheets

HEAT ASSISTED MAGNETIC RECORDING WRITER HAVING POLE COUPLED WITH THE NFT

BACKGROUND

One type of magnetic recording is heat assisted magnetic recording (HAMR). In HAMR, a recording media is heated as part of the writing process. A conventional HAMR write apparatus, such as in a HAMR disk drive, typically includes a waveguide, a near-field transducer (NFT), a write pole and one or more coils. Light from a laser is incident on and coupled into the waveguide. Light is guided by the waveguide to the NFT near the air-bearing surface (ABS), which is adjacent to a magnetic recording media. The NFT focuses the light to magnetic recording media, such as a disk. This region is thus heated. The pole is energized by the coils. The magnetic field from the pole is used to write to the heated portion of the recording media.

Although the conventional HAMR write apparatus functions, there are drawbacks. The field from the conventional pole intended to write the media may not be in the direction desired. For example, the fraction of the field perpendicular to the ABS may be lower than is preferred. As a result, the performance of the conventional HAMR write apparatus may be adversely affected.

DETAILED DESCRIPTION OF THE PREFERRED EMBODIMENTS

While the various embodiments disclosed are applicable to a variety of data storage devices such as magnetic recording disk drives, solid-state hybrid disk drives, networked storage systems etc., for the sake of illustration the description below uses disk drives as examples.

Figures 1A, 1B:
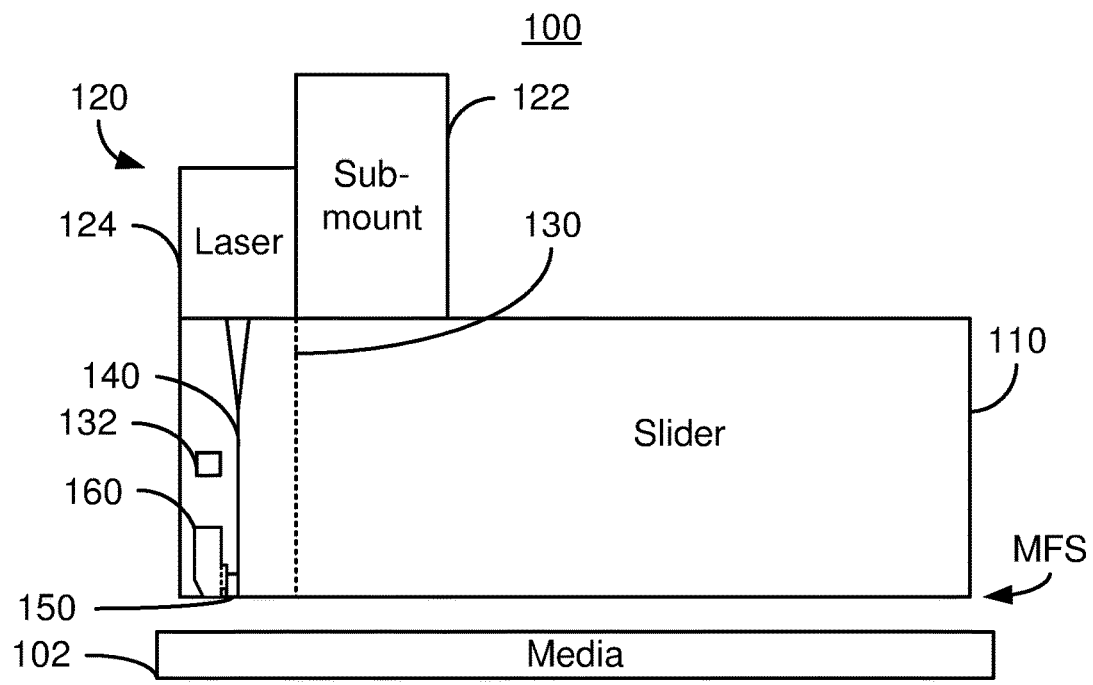
FIGS. 1A and 1B are diagrams depicting a side view and a close-up apex view of an exemplary embodiment of a HAMR write apparatus.

FIGS. 1A and 1B depict side and close-up apex views of an exemplary embodiment of a portion of a HAMR data storage device 100 including a HAMR write apparatus 130. For clarity, FIGS. 1A and 1B are not to scale. For simplicity not all portions of the HAMR data storage device 100 and apparatus 130 are shown. In the embodiment shown, the HAMR data storage device 100 is a HAMR disk drive. In other embodiments, another data storage device may be present. Although the HAMR disk drive 100 and write apparatus 130 are depicted in the context of particular components other and/or different components may be used. For example, circuitry used to drive and control various portions of the HAMR disk drive 100 is not shown. For simplicity, only single components are shown. However, multiples of each component and/or and their sub-components, might be used.

The HAMR disk drive 100 includes media 102, a slider 110, a laser subassembly 120 and the HAMR write apparatus 130. Additional and/or different components may be included in the HAMR disk drive 100. Although not shown, the slider 110, and thus the laser assembly 120 and HAMR write apparatus 130 are generally attached to a suspension (not shown). The laser subassembly 120 includes a submount 122 and a laser 124. The submount 122 is a substrate to which the laser 124 may be affixed for improved mechanical stability, ease of manufacturing and better robustness. The laser 124 may be a chip such as a laser diode or other laser.

The HAMR write apparatus 130 is fabricated on the slider 110 and includes a media-facing surface (MFS) that is proximate to the media 102 during use. Because the HAMR write apparatus 130 is part of a disk drive, the MFS may be an air-bearing surface (ABS). In some embodiments the MFS may be a different gas-bearing surface, such as helium. In general, the HAMR write apparatus 130 and a read apparatus are present in the HAMR data storage device 100. However, for clarity, only the HAMR write apparatus 130 is shown. As can be seen in FIGS. 1A and 1B, HAMR write apparatus 130 includes a waveguide 140, coil(s) 132, a near-field transducer (NFT) 150 and a main pole 160.

The coils 132 may form a helical coil or may be a spiral, or pancake, coil. Although depicted as a single layer, multiple layers may be used for the coil(s) 132. Further, although shown as a single coil, multiple coils may be used. The coils 132 are used to energize the pole 160.

The waveguide 140 is optically coupled with the laser 124 and carries light energy from the laser 124 toward the MFS. Although shown mounted to the slider, the laser may be mounted in another location within the disk drive and still be optically coupled to the waveguide 140. The waveguide 140 typically includes a high index of refraction core, such as tantalum oxide, surrounded by a lower index of refraction cladding, such as alumina and/or silicon oxide. For simplicity, the core is generally depicted as the waveguide 140 in the drawings.

The NFT 150 couples a portion of this energy from the waveguide 140 to the media 102. The NFT 150 resides at or near the MFS and utilizes local resonances in surface plasmons to focus the light to magnetic recording media 102. At resonance, the NFT 150 couples the optical energy of the surface plasmons efficiently into the recording medium layer of the media 102 with a confined optical spot which is much smaller than the optical diffraction limit. This optical spot can rapidly heat the recording medium layer to near or above the Curie point. High density bits can be written on a high coercivity medium with the pole 160 energized by the coils 132 to a modest magnetic field. In the embodiment shown, the NFT 150 occupies part of the MFS and may be formed of Au or an Au alloy. In an alternate embodiment, the NFT 150 might be recessed from the MFS. The NFT 150 might be formed of another material and/or have another shape in other embodiments.

The pole 160 writes to a region of the media 102 and includes a pole tip region shown in FIG. 1B. The pole 160 also has a leading surface closer to the NFT 150 and a trailing surface opposite to the leading surface. The pole tip region has a first portion 162 and a second portion 164. The first portion 162 and second portion 164 are shown as being separated by a dashed line in FIG. 1B. In some embodiments, the first portion 162 and the second portion 164 are formed of the same high moment magnetic material. For example, both portions 162 and 164 of the pole 160 may be include a magnetic material having a saturation magnetization of at least 2.4 T. In other embodiments, the first portion 162 and the second portion 164 may include different materials. Thus, different magnetic and/or nonmagnetic materials may be used in the first portion 162 than the second portion 164. For example, the second portion 164 may be made of a lower moment material having a saturation magnetization of approximately 2.0 T, while the first portion 162 has a saturation magnetization of at least 2.4 T. Thus, the saturation magnetization of the first portion 162 can but need not be the same as the saturation magnetization of the second portion 164 of the pole tip region. However, both portions 162 and 164 are generally desired to be magnetic.

The first portion 162 of the pole tip region occupies part of the MFS. Thus, this portion of the pole tip may be at the ABS/MFS as shown in FIG. 1B. The first portion 162 of the pole tip is separated from the NFT 150 in the down track direction by a distance, d1. For example, a nonmagnetic insulating material such as silicon oxide or alumina may separate the first portion 162 from the NFT 150. In some embodiments, the distance d1 separating the first portion 162 from the NFT 150 is at least ten nanometers and not more than fifty nanometers. For example, d1 may be nominally twenty-five through thirty-five nanometers. The back surface of the first portion 162 is shown at an acute angle, α, from a direction perpendicular to the MFS. For example, α may be at least twenty degrees and not more than sixty degrees.

The second portion 164 of the pole tip region is recessed from the MFS by a distance, d2. The second portion 164 of the pole tip region is also between the first portion 162 of the pole tip region and the NFT 150. The recess from the MFS for the second portion 164 allows the resonance in surface plasmons to be formed by the NFT 150 near the MFS. In some embodiments, the second portion 164 of the pole tip region may be recessed from the MFS by a distance d2 of at least forty-five nanometers. For example, d2 may be at least fifty nanometers and not more than eighty nanometers. In the embodiment shown, the second portion 164 of the pole tip region contacts the NFT 150. Thus, the thickness of the second portion 164 is substantially equal to the distance, d1, the first portion 162 is separated from the NFT 150. Physical contact with the NFT 150 allows the second portion 164 of the pole tip region to conduct heat from the NFT 150. The second portion 164 is also shown as extending along only a portion of the trailing surface (the surface closest to the pole 160) of the NFT 150. In other embodiment, the second portion 164 extends at least to the back of the NFT 150 opposite to the MFS. For example, the second portion 164 may extend at the angle, α, along the back surface of the first portion 162. The second portion 164 of the pole tip region may also extend part way down the back surface of the NFT 150.

The HAMR disk drive 100 may exhibit improved performance. More specifically, the combination of the first portion 162 and second portion 164 of the pole tip region may allow for a field that has the desired angle with the media 102. In some embodiments, the write field may be closer to perpendicular to the media 102/MFS. This improvement may be experienced for both a media 102 having a soft underlayer and for a media 102 that does not have a soft underlayer. Because the second portion 164 of the pole tip region is recessed from the ABS, the NFT 150 may still be able to couple energy into the media 102. Interference between the pole 160 and the optical components 140 and 150 may not significantly affect the optical performance of the HAMR writer apparatus 130. The second portion 164 of the pole tip region 160 may also conduct heat away from the NFT 150, allowing the pole 160 to act as a heat sink. Performance and reliability of the HAMR write apparatus 130 and the data storage device 100 may, therefore, be enhanced.

Figure 2:
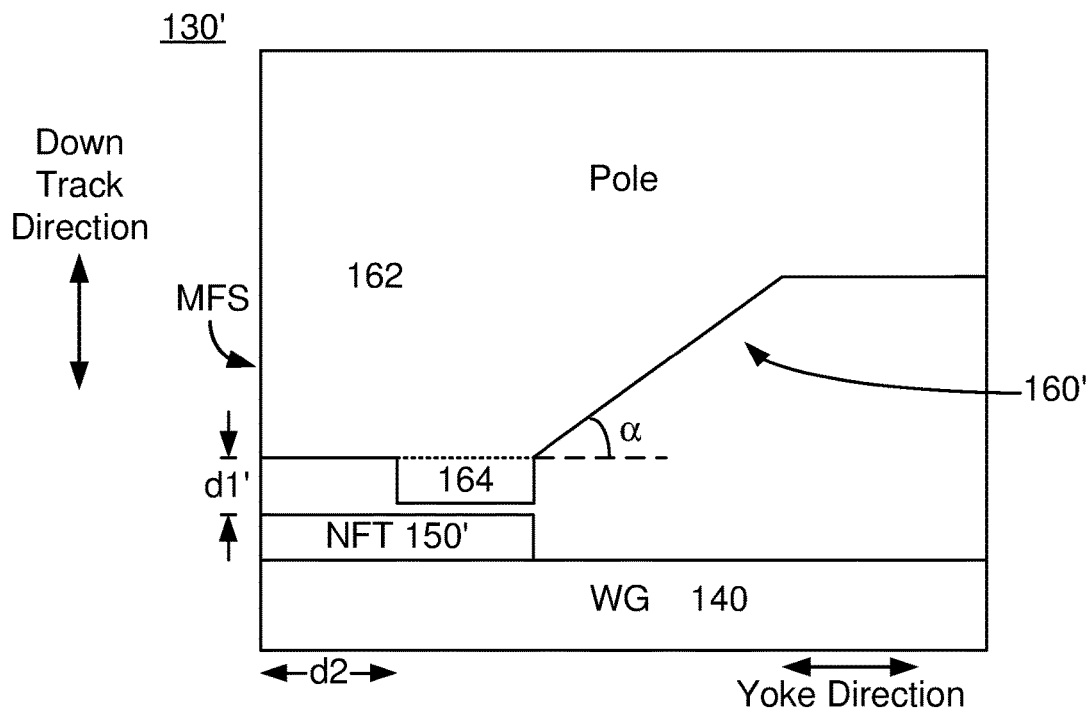
FIG. 2 depicts a close-up apex view of another exemplary embodiment of a HAMR write apparatus.

FIG. 2 depicts an apex view of another exemplary embodiment of a portion of a HAMR write apparatus 130'. For clarity, FIG. 2 is not to scale. For simplicity not all portions of the HAMR write apparatus 130' are shown. The HAMR write apparatus 130' is analogous to the HAMR write apparatus 130. Consequently, analogous components have similar labels. Further, the HAMR write apparatus 130' may be used in the HAMR data storage device 100.

The HAMR write apparatus 130' includes a waveguide 140, a NFT 150' and a pole 160' having a pole tip region having portions 162 and 164 that are analogous to the waveguide 140, NFT 150, pole 160 and pole tip region having portions 162 and 164, respectively. Although not shown, coil(s) and other components are included in the HAMR write apparatus.

The second portion 164 of the pole tip region is recessed the distance d2 from the MFS. In the embodiment shown, the second portion 164 of the pole tip region 164' extends to the back of the NFT 150'. The back of the second portion 164 and the back of the NFT 150' may be substantially aligned. In other embodiments, the NFT 150' may terminate closer to the MFS than the second portion 164. In addition, the second portion 164 is shown as spaced apart from the NFT 150' by a small distance. Thus, the distance d1' between the first portion 162 of the pole tip region and the NFT 150' is slightly larger than the thickness of the second portion 164 of the pole tip region. However, in other embodiments, the second portion 164 may physically contact the NFT 150'.

The HAMR write apparatus 130' may share the benefits of the HAMR write apparatus 130 and the HAMR data storage device 100. The configuration of the first portion 162 and the second portion 164 of the pole tip region may result in a magnetic field having the desired orientation to the media 102 (not shown in FIG. 2). Because the second portion 164 of the pole tip region is recessed from the MFS, the NFT 150' may still be able to couple energy into the media 102. Interference between the pole 160 and the optical components 140 and 150' may not significantly affect the optical performance of the HAMR writer apparatus 130'. Thus, performance and reliability of the HAMR write apparatus 130' and the data storage device 100 may be enhanced.

Figure 3:
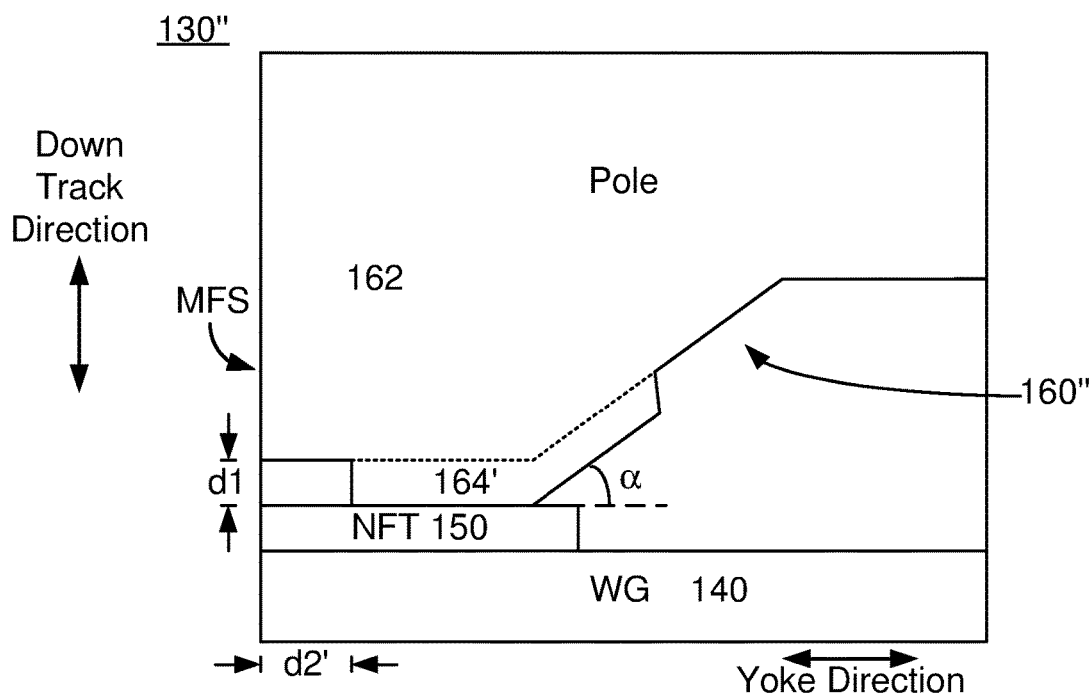
FIG. 3 depicts a close-up apex view of another exemplary embodiment of a HAMR write apparatus.

FIG. 3 depicts an apex view of another exemplary embodiment of a portion of a HAMR write apparatus 130". For clarity, FIG. 3 is not to scale. For simplicity not all portions of the HAMR write apparatus 130" are shown. The HAMR write apparatus 130" is analogous to the HAMR write apparatus(es) 130 and/or 130'. Consequently, analogous components have similar labels. Further, the HAMR write apparatus 130" may be used in the HAMR data storage device 100.

The HAMR write apparatus 130" includes a waveguide 140, an NFT 150 and a pole 160" having a pole tip region having portions 162 and 164' that are analogous to the waveguide 140, NFT 150/150', pole 160/160' and pole tip region having portions 162 and 164, respectively. Although not shown, coil(s) and other components are included in the HAMR write apparatus.

The second portion 164' of the pole tip region is recessed the distance d2 from the MFS. The second portion 164' of the pole tip region 164' also extends further from the MFS than the back of the NFT 150. Stated differently, the back of the second portion 164' terminates further from the MFS than the NFT 150. The second portion 164' may also extend a short distance along the back surface of the first portion 162. Thus, part the second portion 164' of the pole tip may be at acute angle, α, from the MFS. In this embodiment, the second portion 164' is shown as physically contacting the NFT 150. Thus, the distance d1 between the first portion 162 of the pole tip region and the NFT 150 may be the same as the thickness of the second portion 164' of the pole tip region. However, in other embodiments, the second portion 164' may be spaced apart from the NFT 150.

The HAMR write apparatus 130" may share the benefits of the HAMR write apparatus(es) 130/130' and the HAMR data storage device 100. The combination of the first portion 162 and second portion 164' of the pole tip region may allow for a field that has the desired angle with the media (not shown in FIG. 3). For example, the write field may be closer to perpendicular to the media/MFS. Because the second portion 164' of the pole tip region is recessed from the ABS, the NFT 150 may still be able to couple energy into the media 102. The second portion 164' of the pole tip region 160 may also conduct heat away from the NFT 150. Performance and reliability of the HAMR write apparatus 130" and the data storage device 100 may, therefore, be enhanced.

Figure 4:
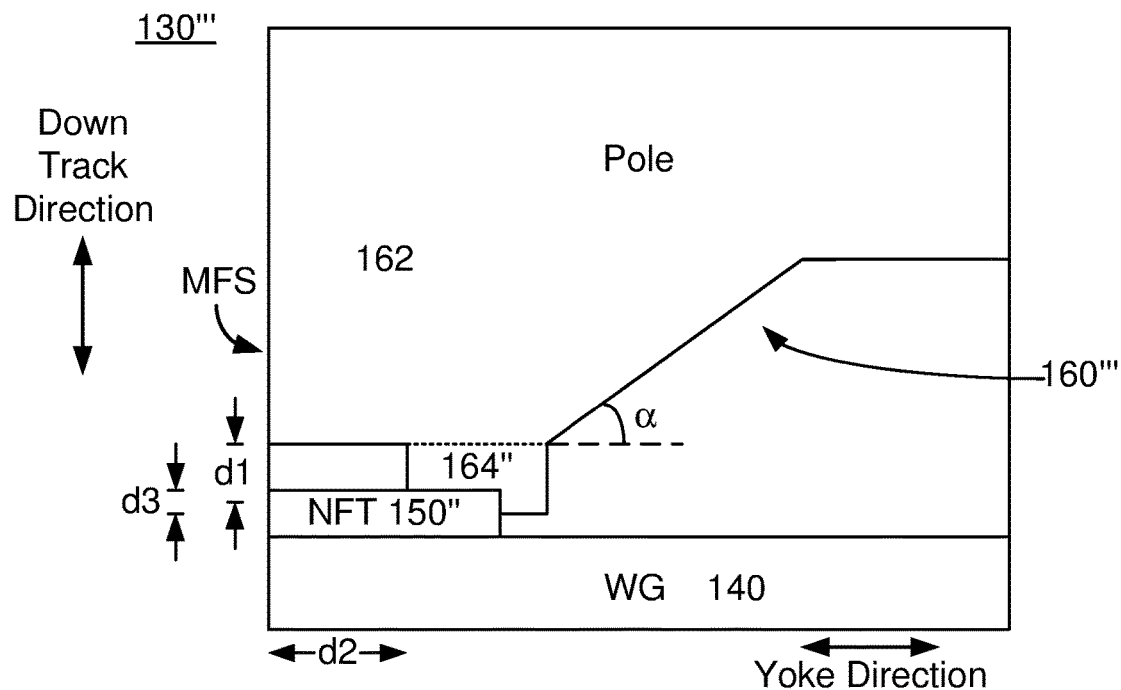
FIG. 4 depicts a close-up apex view of another exemplary embodiment of a HAMR write apparatus.

FIG. 4 depicts an apex view of another exemplary embodiment of a portion of a HAMR write apparatus 130'''. For clarity, FIG. 4 is not to scale. For simplicity not all portions of the HAMR write apparatus 130''' are shown. The HAMR write apparatus 130''' is analogous to the HAMR write apparatus(es) 130, 130' and/or 130". Consequently, analogous components have similar labels. Further, the HAMR write apparatus 130''' may be used in the HAMR data storage device 100.

The HAMR write apparatus 130''' includes a waveguide 140, an NFT 150" and a pole 160''' having a pole tip region having portions 162 and 164" that are analogous to the waveguide 140, NFT 150/150', pole 160/160' and pole tip region having portions 162 and 164/164', respectively. Although not shown, coil(s) and other components are included in the HAMR write apparatus.

The second portion 164" of the pole tip region is recessed the distance d2 from the MFS. The second portion 164" of the pole tip region 164" extends further from the MFS than the back of the NFT 150". In addition, the second portion 164" also extends a short distance, d3, along the back surface of the NFT 150". The distance, d3, may be not more than half of the thickness of the NFT 150". In this embodiment, the second portion 164" is shown as physically contacting the NFT 150". Thus, the distance d1 between the first portion 162 of the pole tip region and the NFT 150" may be the same as the thickness of the second portion 164" of the pole tip region. However, in other embodiments, the second portion 164" may be spaced apart from the NFT 150".

The HAMR write apparatus 130''' may share the benefits of the HAMR write apparatus(es) 130/130'/130" and the HAMR data storage device 100. The combination of the first portion 162 and second portion 164" of the pole tip region may allow for a field that has the desired angle with the media (not shown in FIG. 3). The write field may be closer to perpendicular to the media/MFS. Because the second portion 164" of the pole tip region is recessed from the ABS, the NFT 150" may still be able to couple energy into the media 102. The second portion 164" of the pole tip region 160 may also conduct heat away from the NFT 150". Performance and reliability of the HAMR write apparatus 130''' and the data storage device 100 may, therefore, be enhanced.

Various features of the HAMR write apparatuses 130, 130', 130" and 130''' have been depicted and discussed with respect to FIGS. 1A-1B, 2, 3 and 4. However, one of ordinary skill in the art will recognize that various aspects of the HAMR write apparatuses 130, 130', 130" and/or 130''' may be combined in manners not shown and not inconsistent with the description herein.

Figure 5:
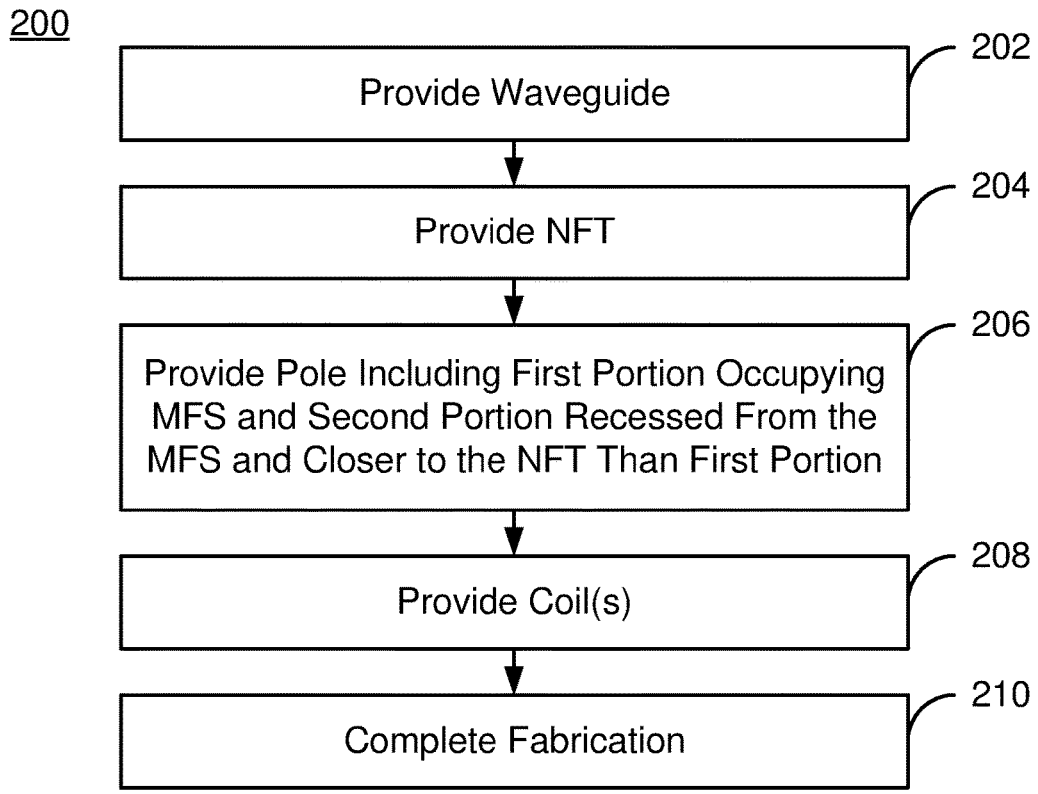
FIG. 5 is a flow chart depicting an exemplary embodiment of a method for fabricating a HAMR write apparatus.

FIG. 5 is a flow chart depicting an exemplary embodiment of a method 200 for fabricating a HAMR write apparatus. The method 200 may be used in fabricating write apparatuses such as the write apparatuses 130, 130', 130" and/or 130''', though other write apparatuses might be so fabricated. For clarity, the method 200 is described in the context of the write apparatus 130 depicted in FIGS. 1A-1B. Some steps may be omitted, performed in another order, interleaved and/or combined. The magnetic recording write apparatus being fabricated may be part of a merged head that also includes a read apparatus (not shown) and resides on a slider (not shown) in a disk drive. However, other write apparatuses used with other data storage devices may be manufactured using the method 200. The method 200 is also described in the context of providing a single magnetic recording write apparatus. However, the method 200 may be used to fabricate multiple write apparatuses at substantially the same time. The method 200 and system are also described in the context of particular layers. However, in some embodiments, such layers may include multiple sublayers. The method 200 also may commence after formation of other portions of the write apparatus is completed.

The waveguide 140 may be provided, via step 202. Step 202 generally includes forming cladding layers surrounding a core layer. For example, a core layer maybe deposited on a cladding layer. The core may then be photolithographically defined from the core layer. An additional cladding layer may be deposited on the core. An NFT 150 may optionally be provided, via step 204. The NFT 150 is typically a metal such as gold and formation may include multiple substeps.

The main pole 160 is provided, via step 206. Step 206 includes providing the first portion 162 and second portion 164 of the pole tip region. For example, the nonmagnetic insulating layer may be deposited on the NFT. A portion of this layer may be removed. Thus, a trench having a shape and location of the second portion 164 may, therefore, be formed. The trench may also provide room for the remaining portion of the pole 160. The insulting layer between the NFT 150 and first portion 162 of the pole tip region may remain. The material(s) for the pole 160 may then be provided. For example, plating, sputtering or other methods for depositing or growing the pole 160 may be carried out. If the first portion 162 and second portion 164 of the pole tip are formed of different materials, then multiple deposition steps may be performed. Further, bevels and or other features of the trailing surface of the pole 160 may be fabricated.

The coil(s) 132 may also be formed, via step 208. Step 208 generally includes multiple depositing, masking and removal steps. Further, portions of step 208 may be interleaved with one or more of the steps 202, 204 and 206. For example, if the coil 132 is a helical coil, than a portion of the coil 132 may be formed prior to the pole 160. Fabrication of the write apparatus may then be completed, via step 210.

Using the method 200, the HAMR write apparatus 130, 130', 130" and/or 130''' may be fabricated. The benefit(s) of one or more of the HAMR write apparatus(s) 130, 130', 130" and/or 130''' may thus be achieved.

We claim:

1. A heat assisted magnetic recording (HAMR) write apparatus coupled with a laser for providing energy and having a media-facing surface (MFS), the HAMR write apparatus comprising:
   a waveguide optically coupled with the laser and directing a first portion of the energy toward the MFS;
   a near-field transducer (NFT) optically coupled with the waveguide;
   a pole including a pole tip region, a first portion of the pole tip region occupying a portion of the MFS and separated from the NFT in a down track direction by a distance, a second portion of the pole tip region being recessed from the MFS and between the first portion and the NFT; and
   at least one coil for energizing the pole.

2. The HAMR write apparatus of claim 1 wherein the second portion of the pole tip region adjoins the NFT.

3. The HAMR write apparatus of claim 1 wherein the distance is at least ten nanometers and not more than fifty nanometers.

4. The HAMR write apparatus of claim 1 wherein the second portion of the pole tip region is recessed from the MFS by at least forty-five nanometers.

5. The HAMR write apparatus of claim 1 wherein the first portion of the pole tip region includes a first magnetic material and the second portion of the pole tip region includes a second magnetic material different from the first magnetic material.

6. The HAMR write apparatus of claim 1 wherein the first portion of the pole tip region includes a first magnetic material and the second portion of the pole tip region includes the first magnetic material.

7. The HAMR write apparatus of claim 1 wherein the NFT includes a back surface opposite from the MFS and a part of the second portion of the pole tip region extends along a portion of the back surface.

8. The HAMR write apparatus of claim 7 wherein the part of the second portion of the pole tip extends along not more than half of the back surface of the NFT.

9. The HAMR write apparatus of claim 1 wherein a front surface of the NFT resides at the MFS.

10. A data storage device comprising:
    a media;
    a laser; and
    a heat assisted magnetic recording (HAMR) write apparatus coupled with the laser and having a media-facing surface (MFS), the laser for providing energy to the HAMR write apparatus, the HAMR write apparatus including a waveguide, a near-field transducer (NFT), a pole and at least one coil for energizing the pole, the waveguide being optically coupled with the laser and for directing a first portion of the energy toward the MFS, the NFT being optically coupled with the waveguide, the pole including a pole tip region, a first portion of the pole tip region occupying a portion of the MFS and separated from the NFT in a down track direction by a distance, a second portion of the pole tip region being recessed from the MFS and between the first portion and the NFT, the second portion of the pole tip region adjoining the NFT.

11. A method for providing a heat assisted magnetic recording (HAMR) write apparatus coupled with a laser for providing energy and having a media-facing surface (MFS), the method comprising:
    providing a waveguide optically coupled with the laser and directing a first portion of the energy toward the MFS;
    providing a near-field transducer (NFT) optically coupled with the waveguide;
    providing a pole including a pole tip region, a first portion of the pole tip region occupying a portion of the MFS and separated from the NFT in a down track direction by a distance, a second portion of the pole tip region being recessed from the MFS and between the first portion and the NFT; and
    providing at least one coil for energizing the pole.

12. The method of claim 11 wherein the second portion of the pole tip region adjoins the NFT.

13. The method of claim 11 wherein the distance is at least ten nanometers and not more than fifty nanometers.

14. The method of claim 11 wherein the second portion of the pole tip region is recessed from the MFS by at least forty-five nanometers.

15. The method of claim 11 wherein the first portion of the pole tip region includes a first magnetic material and the second portion of the pole tip region includes a second magnetic material different from the first magnetic material.

16. The method of claim 11 wherein the first portion of the pole tip region includes a first magnetic material and the second portion of the pole tip region includes the first magnetic material.

17. The method of claim 11 wherein the NFT includes a back surface opposite from the MFS and a part of the second portion of the pole tip region extends along a portion of the back surface.

18. The method of claim 17 wherein the part of the second portion of the pole tip extends along not more than half of the back surface of the NFT.

19. The method of claim 11 wherein a front surface of the NFT resides at the MFS.

* * * * *